3,409,372
OPTICAL ANALYZER
Leo H. Ricken, Cleveland, Ohio, assignor to Beckman
  Industries, Inc., a corporation of California
   Filed Dec. 9, 1965, Ser. No. 512,737
         1 Claim. (Cl. 356—82)

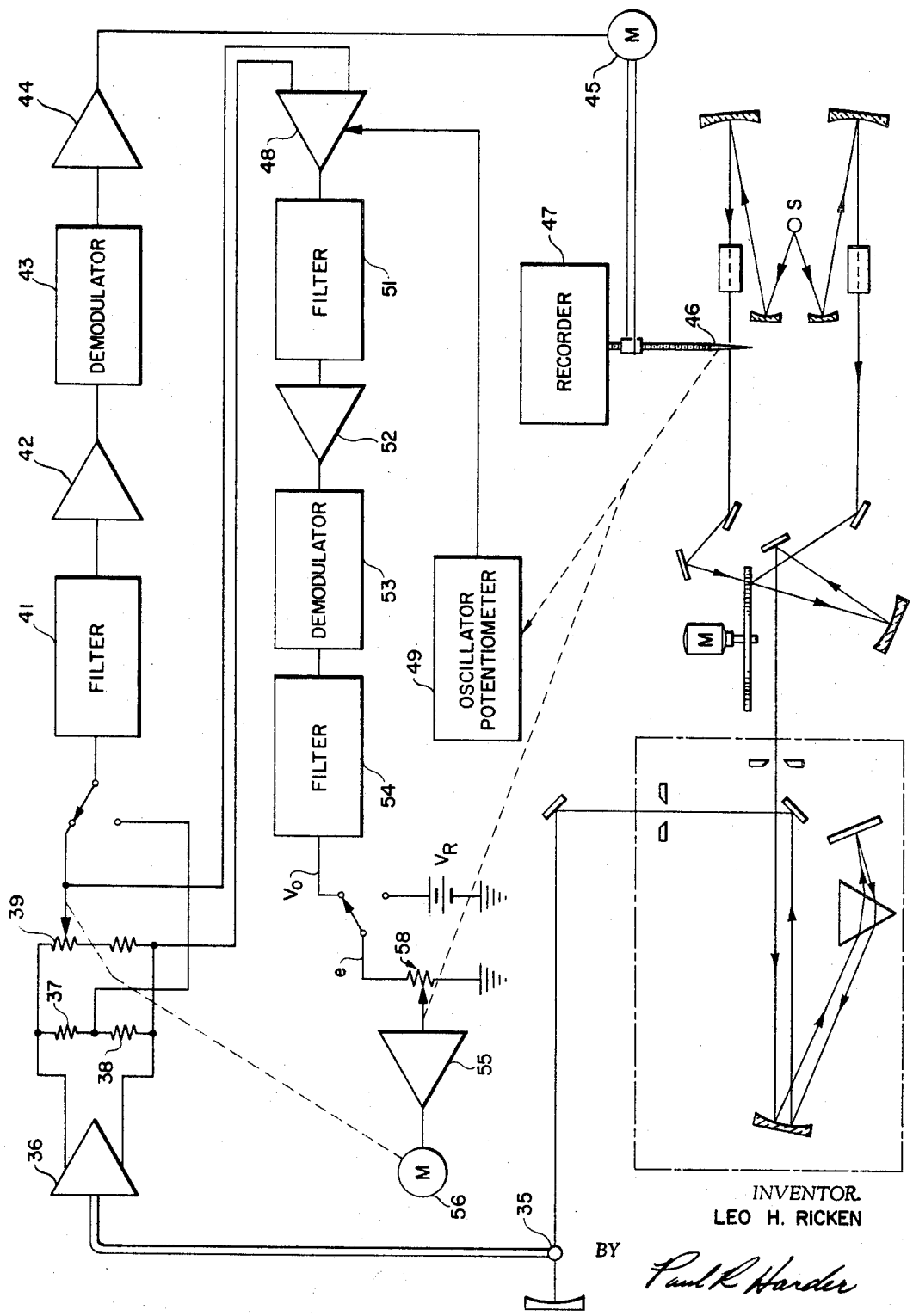

This invention relates to optical analyzers and more particularly to optical analyzers of the double beam, optical null type having an improved automatic gain control loop.

One type of known double beam, optical null analyzer is the spectrophotometer disclosed in United States Patent 2,984,149. In that analyzer, radiation from the source is divided to provide reference and sample beams and recombined by a beam combiner so that each of the beams time share a common path which includes a monochromator and a detector. With this system the output of the detector may be divided into two components, one component having a frequency $f$ equal to the beam switching frequency and a second component $2f$ equal to twice that frequency. The $f$ component is proportional to the average of the intensity difference between the reference and sample beams or $$\frac{I - I_2}{2}$$

This component is utilized in the optical attenuator servo loop to control the optical attenuator in the reference beam path to balance the intensity of the two beams.

The $2f$ component of the detector output is proportional to the average intensity of the two beams or $$\frac{I + I_2}{2}$$

Since the optical attenuator servo loop operates to maintain these intensities substantially equal the system is normally at or near a null condition where $I = I_2$. Therefore, the $2f$ signal is proportional to I. The position of the optical attenuator and the position of the recording pen are each proportional to the transmittance of the sample T which is defined as the ratio of the energy in the sample beam to the energy incident upon the same or $I/I_0$. If the $2f$ signal is multiplied by the reciprocal of the pen position we have $$I \cdot \frac{I_o}{I} = I_o \qquad (1)$$

This multiplication produces a signal which is proportional to the intensity of the reference beam with no sample absorption or $I_o$.

In order to provide an optimum response in the attenuator servo loop it is generally desirable to maintain the gain of the attenuator servo loop substantially constant. An analysis of the attenuator servo loop will show that the gain of this loop is a function of the background energy or $I_o$. It is then necesary to compensate for variations in background energy. Background energy is dependent upon several factors; e.g., radiated energy by the source, air absorption, solvent absorption, detector sensitivity; all of these factors are to some extent wavelength dependent.

In order to maintain this background energy substantially constant this prior art reference provides a secondary or gain servo loop which is utilized to control potentiometer 39 of FIG. 1 of Patent 2,984,149 in such a manner that as the background energy decreases the attenuation provided by this potentiometer is decreased such that the net input to filter 41 does not vary as a function of $I_o$. The patent teaches that the gain of the primary servo loop may also be controlled by varying one of the slits of the monochromator.

To obtain an $I_o$ signal the prior art system provides an automatic gain signal amplifier 48 having a gain which is controlled in response to the attenuator or pen position such that the multiplication required by Equation 1 is performed within this amplifier. The $2f$ component from the automatic gain signal amplifier 48 is thus proportional to $I_o$. The $f$ component is removed by filter 51 and the $2f$ component amplified, demodulated and filtered to provide a D.C. signal which is a function of $I_o$. This D.C. signal is compared with a fixed reference voltage to provide an error signal that is applied to the input of gain servo amplifier 55. The output of the servo amplifier causes motor 56 to drive the gain potentiometer 39 in such a direction as to reduce the error signal to zero. By this means the background energy or $I_o$ is made to appear constant.

It is obvious that the performance of the optical attenuator loop is a function of the performance of the secondary or gain servo loop. It is further obvious that the performance of the gain servo loop is limited by signal-to-noise considerations just as is the attenuator loop. An analysis of the gain control loop will show that the open loop gain is constant and therefore is independent of sample transmittance T. This means that the signal-to-noise ratio of the loop varies as a function of T, an undesirable condition.

The following is an analysis of the open loop transfer function of the gain control servo loop and the reference numerals are those indicated in FIG. 1 of Patent 2,984,149. Let $F_o$ = open loop transfer function of the gain servo loop;
$I_o$ = intensity of the radiant energy emitted by source $f$, at a given wavelength;
$T$ = sample transmittance or $I/I_o$;
$I_oT$ = the radiant energy impinging upon the detector after attenuation $$I_o \frac{T}{100}$$

$K_1$ = the proportionality factor for output voltage from detector 35 as a function of radiant energy impinging thereon;
$K_2$ = gain of amplifier 36;
$A_1$ = attenuation provided by gain potentiometer 39;
$K_3$ = gain of amplifier 48;
$G_1$ = transfer function of filter 51;
$K_4$ = gain of amplifier 52;
$K_5$ = transfer function of demodulator 53 and filter 54;
$V_R$ = D.C. reference voltage;
$e$ = error signal input to gain servo amplifier 55;
$K_6$ = gain of servo amplifier 55;
$G_2$ = the transfer function of motor 56 and the mechanical mechanism.

If we open the gain control loop by disconnecting the mechanical linkage from gain potentiometer 39 the open loop gain may be analyzed as follows. Radiation at a given wavelength $\lambda$ emerging from source S ($I_o$) is divided and after attenuation by the sample and the attenuator ($I_oT$) is applied to the detector. The output voltage from the detector ($I_oTK_1$) is amplified ($I_oTK_1K_2$), passed by attenuator 39 ($I_oTK_1K_2A_1$) and again amplified at 48 ($I_oTK_1K_2A_1K_3$). The output signal of amplifier 48 is filtered, amplified, demodulated and further filtered ($I_oTK_1K_2A_1K_3G_1K_4K_5$).

The output signal of filter 54 ($V_o$) is compared with a reference voltage $V_R$ to provide a difference or error signal $e$. This error signal is amplified ($eK_6$) and applied to the servo mechanism ($eK_6G_2$) which controls attenuator 39.

As has been pointed out, the gain of amplifier 48 is controlled so as to vary as a function of the reciprocal of sample transmittance or $1/T$. Thus:

$$K_3 = K1/T \qquad (2)$$

where K is a constant.

From the foregoing analysis the following equations may be written:

$$V_o = I_o T K_1 K_2 A_1 K_3 G_1 K_4 K_5 \qquad (3)$$

Substituting Equation 2 in Equation 3 and simplifying we have:

$$V_o = I_o K_1 K_2 A_1 K G_1 K_4 K_5 \qquad (4)$$

The error voltage $e$ is:

$$e = V_o - V_R \qquad (5)$$

The open loop equation is:

$$F_o = e K_6 G_2 \qquad (6)$$

and substituting 4 and 5 in 6 we have:

$$F_o = K_6 G_2 (I_o K_1 K_2 K G_1 K_4 K_5 - V_R) \qquad (7)$$

As illustrated in Equation 7 the open loop gain of the gain servo loop is independent of sample transmittance T. The detector signal $I_o T K_1$ is directly proportional to T but the output signal $V_o$ from filter 54 is independent of T as the result of the gain boost with a factor $1/T$ that is provided by automatic gain signal amplifier 48.

One of the most significant noise contributing elements in the above described optical analyzer is the detector. Most detectors, particularly those utilized in the infrared region, generate a substantially constant amount of noise regardless of the radiant energy impinging thereon. If the noise output of detector 35 is substantially constant it is apparent that the signal output of the detector ($I_o T K_1$) will have a signal-to-noise ratio that is inversely proportional to T. It should be apparent that although the open loop gain of the gain servo loop is constant, the signal-to-noise ratio of the loop varies as a function of T. Thus, the operating conditions for the gain servo loop must be set for the worst possible case anticipated if operation under all conditions is to be secured.

Assume for example that the attenuator loop and the gain control loop are working at optimum conditions. This means that the time constants in the noise rejection filters are chosen to give the highest possible recording speed for the particular gain set. If now a sample is introduced or an absorption band in the sample is encountered and transmittance drops to 1%, the gain of automatic gain signal amplifier 48 will increase by 100. The gain servo loop must now cope with a signal-to-noise ratio that is 100 times worse than that under the optimum conditions. In the analyzer disclosed in U.S. Patent 2,984,149 there is no solution to this problem other than setting the operating conditions of the loop for the worst anticipated case giving non-optimum performance under normal conditions.

The single figure is a schematic diagram of an improved radiation comparison system of the type illustrated in Patent No. 2,984,149 that overcomes the foregoing disadvantage.

The reference numerals utilized herein are the same as those utilized in FIG. 1 of Patent No. 2,984,149 and a description of the operation of the system may be found in detail in that patent.

The D.C. output voltage from filter 54, which as has been hereinbefore shown is proportional to $I_o$, is compared with a reference voltage $V_R$ to form an error signal $e$ equal to the difference. If now between the comparator and servo amplifier 55 we introduce an error voltage attenuator 58 having its slider 59 mechanically coupled to attenuator 46 in such a manner that the attenuation provided by attenuator 58 is directly proportional to the transmittance of the sample, we may make the gain of the gain control servo loop proportional to sample transmittance T, thus making the signal-to-noise ratio of this loop independent of T. Thus, the system may be set for the optimum operating conditions without regard to the worse condition case. If we analyze the open loop equation we find that the open loop transfer function of the modified gain control servo loop is $$F_o = e A_2 K_6 G_2 \qquad (8)$$

where $A_2$ is the attenuation factor of attenuator 58. If slider 59 is driven so that $$A_2 = AT \qquad (9)$$

where A is a constant, then:

$$F_o = e A T K_6 G_2 \qquad (10)$$

The open loop transfer function is:

$$F_o = A K_6 G_2 T (I_o K_1 K_2 K G_1 K_4 K_5 - V_R) \qquad (11)$$

It is now apparent from Equation 11 that the open loop gain of the gain control servo loop is a function of T. This means that at high values of transmittance (T) the loop gain is high while at low values of T the loop gain is low. The effect of this is that the gain control loop is somewhat sluggish when the transmission of the sample is low which is advantageous. When sample transmittance is low the signal-to-noise ratio of the detector output signal is poor; however, since the loop gain of the gain control servo loop has been automatically decreased, servo motor 56 will not respond to the new noise level. Therefore, it is possible to set the working conditions of the automatic gain control servo loop for optimum operating conditions of the main attenuator loop and one may always then expect proper operation even at low transmission values.

Various modifications are contemplated and may obviously be resorted to by those skilled in the art without departing from the spirit and scope of the invention as set forth in the appended claim. For example, the attenuator 58 may be replaced by a variable gain amplifier having its gain controlled as a direct function of transmittance.

What is claimed is:
1. In combination:
a radiation source;
a monochromator;
a radiation detector generating an electrical output signal as a function of radiant energy impinging thereon;
means defining reference and sample beam paths from said source through said monochromator to said detector;
a reference beam attenuator positioned in said reference beam path;
servo loop means responsive to the output signal of said detector for controlling the position of said beam attenuator to control the energy in said reference beam path and balance the energies in said paths;
means connected to said detector for producing an electrical signal varying directly as a function of background radiation;
means comparing said signal produced by said last named means with a fixed reference signal for producing an error signal;
means connected to said comparison means and said attenuator for modifying said error signal in response to the attenuator position thereby modifying said error signal proportional to sample transmittance; and
means connected to receive said modified signal for controlling the gain of said attenuator servo loop means.

No references cited.

JEWELL H. PEDERSEN, *Primary Examiner.*

F. L. EVANS, *Assistant Examiner.*